Oct. 3, 1933.   L. W. GRAYSON   1,928,816
STEERING GEAR SAFETY DEVICE
Filed July 30, 1932
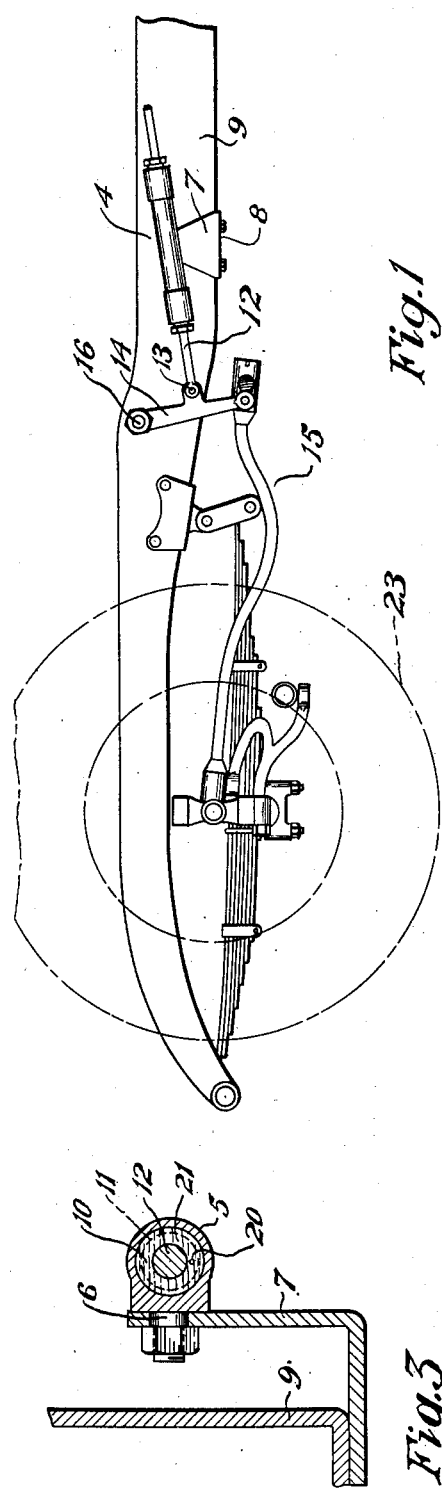
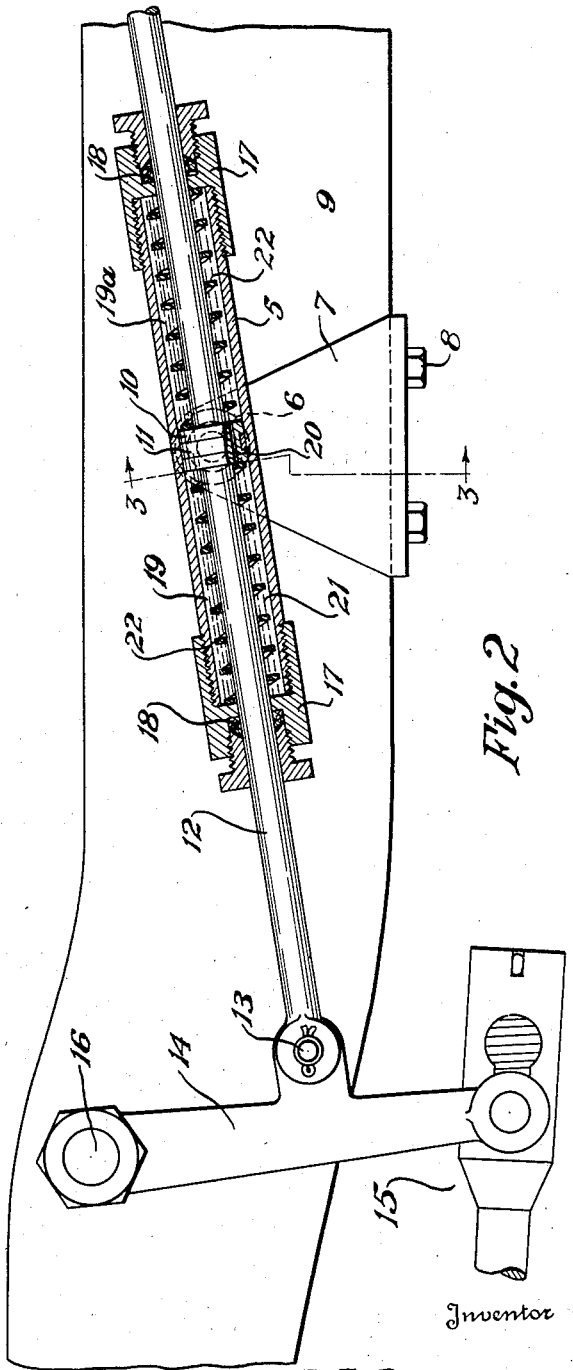
Inventor
L. W. Grayson
By Freare and Bishop
Attorneys Patented Oct. 3, 1933

1,928,816

UNITED STATES PATENT OFFICE 1,928,816

STEERING GEAR SAFETY DEVICE

Luther W. Grayson, Navarre, Ohio, assignor of one-half to Warner S. Bloomberg, Massillon, Ohio Application July 30, 1932. Serial No. 626,293

6 Claims. (Cl. 280—90)

The invention relates to motor vehicles, and more particularly to a steering gear safety device for motor vehicles.

Serious accidents occur annually and a large number of lives are lost as a result of the accidents, from a loss of control of motor vehicles by the drivers thereof; because of tire failures on motor vehicles, because of abnormal road shock, shimmying, and the like, when motor vehicles are being driven over roads in poor condition having soft shoulders, soft spots, ruts, chuck holes and the like, or because of over-control of the steering mechanism, particularly when the same is worn, when motor vehicles are running over such roads, or are rounding sharp curves.

It is therefore an object of the present invention to provide a motor vehicle with a positive acting steering gear safety device which enables the driver of the motor vehicle to maintain full and complete control of the steering of the motor vehicle when the same is operating at any speed, regardless of road conditions.

It is a further object of the present invention to provide a motor vehicle with a steering gear safety device, which absorbs and/or eliminates the wheel action known as shimmying and/or prevents the same from being transmitted to the steering post or steering wheel of the motor vehicle.

It is a further object of the present invention to provide a motor vehicle with a steering gear safety device, which materially lessens the tendency of a driver to over-control the steering of a motor vehicle when the direction of the course of travel of the motor vehicle is suddenly changed as by rounding a curve, or when the motor vehicle is moving over a road in poor condition.

It is a further object of the present invention to provide a motor vehicle with a steering gear safety device, which enables full control and safe operation of a motor vehicle on soft shoulders of a road, on a dirt road where there are high or low soft spots, or on any road which is in poor condition and has ruts, chuck holes, bumps and the like therein.

It is a further object of the present invention to provide a motor vehicle with a steering gear safety device which enables the motor vehicle to be kept under control when a tire failure, particularly of one of the front tires occurs, while the motor vehicle is being driven at any reasonable speed.

Moreover, it is an object of the present invention to provide a motor vehicle with a steering gear safety device, which materially reduces the wear on various parts of the steering gear and thus renders adjustment, repair or replacement of the parts infrequent.

It is also a further object of the present invention to provide a motor vehicle with a steering gear safety device, which eliminates and/or absorbs all road shock, vibration and the like in the steering gear before the same is transmitted to the steering post or steering wheel of the motor vehicle.

Moreover, it is an object of the present invention to provide a motor vehicle with a steering gear safety device, which imposes only a slight resistance to the operation of the steering wheel by the driver, when it is desired to change the direction of travel of the motor vehicle by turning the steering wheel.

And finally, it is an object of the present invention to accomplish the aforesaid desiderata by utilizing a steering gear safety device which is extremely simple in design, and inexpensive to manufacture, and which may be readily, quickly and easily attached to any model of any style or make of usual motor vehicle.

These and other objects may be obtained by the elements, parts, devices, combinations and arrangements constituting the present invention, a preferred embodiment of which is shown in the accompanying drawing and is hereinafter described in detail and claimed, which may be stated in general terms as including in combination with a pivotally mounted pitman arm of the steering gear of a motor vehicle having a frame, a safety device including a preferably tubular cylinder preferably pivotally mounted on the motor vehicle frame, a piston rod extending entirely through said cylinder and pivotally connected preferably at one end to the pitman arm, a double acting piston on the piston rod within the cylinder, closure means including packing glands through the piston rod extension for each end of the cylinder forming with the piston a plurality of compartments, there being an opening of predetermined size through the piston communicating between the compartments, a fluid medium completely filling said compartments and openings, and a spring in each compartment interposed and acting between the piston and the closure means of each compartment.

In the drawing,

Figure 1 is a fragmentary partially diagrammatic side elevation view of a portion of a motor vehicle, showing a preferred embodiment of the improved steering gear safety device connected to the pitman arm of the motor vehicle steering gear;

Fig. 2 is an enlarged fragmentary view of some of the parts shown in Fig. 1, showing the improved steering gear safety device in longitudinal section; and Fig. 3 is a fragmentary section taken on the line 3—3, Fig. 2.

Similar numerals refer to similar parts throughout the drawing.

The improved steering gear safety device is indicated generally at 4 and preferably includes a tubular cylinder 5, which is pivotally mounted, preferably by means of a stud 6, on a bracket 7, preferably connected at 8, to the frame member 9 of a motor vehicle.

A piston 10, provided with a piston ring 11, is mounted on the piston rod 12, which extends entirely through the cylinder 5 and is pivotally connected, preferably at one end as shown at 13, preferably to an intermediate portion of the pitman arm 14 of the motor vehicle steering gear indicated generally at 15. The pitman arm 14 is pivotally mounted at 16, by means of a shaft extending preferably through the frame member 9, and is operatively connected by any usual means with the steering post and steering wheel of the motor vehicle.

The cylinder 5 is closed at its end portions by the closure means 17, which include packing glands 18 through which the piston rod 12 extends, so that two compartments 19 and 19a are formed in the cylinder between the piston 10 and the closure means 17 therefor.

A by-pass opening 20 is provided, extending through the piston 10 and comunicating between the compartments 19 and 19a, and a fluid medium, preferably oil and the like, indicated at 21, completely fills the compartments 19 and 19a and the opening 20 communicating therebetween. Springs 22 are preferably located in each compartment 19 and 19a interposed between the piston 10 and the closure means 17 for a purpose which will be hereinafter described.

During operation of the motor vehicle, if the wheel, one of which is indicated diagrammatically at 23, ride over any bumps or the like, or as a result of shimmying, produce vibration of, or improper movement of the parts of the steering gear 15, the vibration or movement is transmitted to the pitman arm 14 and thence to the piston rod 12 and is resisted by the fluid medium contained within the compartments 19 and 19a of the cylinder 5, which acts against the piston 10.

These vibrations or sudden movements of the steering gear resulting from road shock, shimmying and the like, or resulting from a tire failure, would ordinarily produce instantaneous movement of the parts of the steering gear 15 and the safety device 4 prevents, absorbs or eliminates such instantaneous movement of the parts of the steering gear.

The size of the by-pass opening 20 is designed so as to regulate the speed at which the steering wheel may be turned to operate the steering gear, and when the wheel is turned, the movement of the pitman arm 14 is controlled by the piston rod 12 and the piston 10, which may only be moved as fast as the fluid medium can move between the compartments 19 and 19a through the opening 20 of the said predetermined size.

Thus, a slight resistance is offered to the turning of the steering wheel, but this is not a disadvantage in operating the steering mechanism since it prevents over-control or over-operation of the steering gear when the course of travel of the motor vehicle is suddenly intentionally changed for one reason or another.

Of course it is understood that if the movement of parts of the steering gear because of road shock, shimmying and the like, is relatively gradual, the piston 10 will move back and forth in the cylinder 5 in the same manner that it moves when the steering wheel is operated, but the vibratory effect of the road shock and the like is entirely dampened or smoother out by the safety device 4, so that no vibration, causing loss of control of the motor vehicle, is transmitted beyond the pitman arm 14 of the steering gear, and therefore cannot reach the steering wheel or be noticed by the driver.

The springs 22 are preferably under slight compression and hold or maintain the piston 10 in a normal position preferably centrally in the cylinder 5, at which normal position the direction of travel of the motor vehicle will be straight. Moreover, the springs 20 aid in returning the front wheels of the motor vehicle to a straight line by returning the steering gear parts to normal position after the wheels have been turned for rounding a curve in a road and the like. Of course the cylinder 5 is of such a length as to permit the springs 22 to be fully compressed by a full movement of the piston 10 in either direction when the pitman arm 14 moves to the full limits of its movement in its arc of travel.

I have discovered, as a result of tests in driving a motor vehicle equipped with my improved safety device, that the vehicle may be maintained under complete control at all speeds regardless of road conditions, that the action of the car known as shimmying is eliminated, that a tendency to overcontrol the steering gear by sudden operation of the steering mechanism is substantially eliminated, that no vibration is transmitted to the steering wheel when the vehicle is run on soft shoulders or over dirt roads in poor condition, that the motor vehicle may be kept under full control when a tire failure occurs when the car is being driven at any reasonable speed, that all road shock is absorbed by the safety device and is not transmitted to the steering wheel, and that wear on the steering gear parts is greatly reduced.

I claim:—

1. In combination with the pitman arm of the steering gear of a motor vehicle, a safety device including a tubular cylinder mounted on the motor vehicle, a piston rod extending entirely through said cylinder and connected to the pitman arm, a double acting piston on the piston rod within the cylinder, closure means for each end of the cylinder including packing glands through which the piston rod extends, said closure means forming with said cylinder and piston a plurality of compartments, there being an opening of predetermined size through the piston communicating between the compartments, a fluid medium completely filling said compartments and opening, and yielding means in each compartment tending to hold said piston in a preselected normal position and to return the piston to normal position upon movement of the piston by the pitman arm.

2. In combination with the pitman arm of the steering gear of a motor vehicle having a frame, a safety device including a plurality of telescoping parts, one of said parts being pivotally connected to said pitman arm, another of said parts being pivotally connected to the motor vehicle frame, means acting between said parts controlling relative movement of said parts, and yielding means acting between said parts tending to hold said parts in a preselected normal position and to return said parts to normal position upon relative movement therebetween by said pitman arm.

3. In combination with the pitman arm of the steering gear of a motor vehicle, a safety device including a tubular cylinder mounted on the motor vehicle, a piston rod extending entirely through said cylinder and connected to the pitman arm, a double acting piston on the piston rod within the cylinder, closure means for each end of the cylinder including packing glands through which the piston rod extends, said closure means forming with said cylinder and piston a plurality of compartments, there being an opening of predetermined size through the piston communicating between the compartments, a spring in each compartment interposed and acting between the piston and the closure means of said compartment, and a fluid medium completely filling said compartments and opening.

4. In combination with the pitman arm of the steering gear of a motor vehicle, a safety device including a tubular cylinder mounted on the motor vehicle, a piston rod extending entirely through said cylinder and connected to the pitman arm, a double acting piston on the piston rod within the cylinder, closure means for each end of the cylinder including packing glands through which the piston rod extends, said closure means forming with said cylinder and piston a plurality of compartments, means communicating between the compartments, means in each compartment tending to hold said piston in a preselected normal position and to return the piston to normal position upon movement of the piston by the pitman arm, and a fluid medium completely filling said compartments and communicating means.

5. In combination with the pivotally mounted pitman arm of the steering gear of a motor vehicle, a safety device including a tubular cylinder pivotally mounted on the motor vehicle, a piston rod extending entirely through said cylinder and pivotally connected to the pitman arm, a double acting piston on the piston rod within the cylinder, closure means for each end of the cylinder including packing glands through which the piston rod extends, said closure means forming with said cylinder and piston two compartments, there being an opening of predetermined size through the piston communicating between the compartments, and a fluid medium completely filling said compartments and opening.

6. In combination with the pitman arm of the steering gear of a motor vehicle pivotally mounted on the frame of said motor vehicle, a safety device including a tubular cylinder pivotally mounted on the frame of the motor vehicle, a piston rod extending entirely through said cylinder and pivotally connected at one end to an intermediate portion of the pitman arm, a double acting piston on the piston rod within the cylinder, closure means for each end of the cylinder including packing glands through which the piston rod extends, said closure means forming with said cylinder and piston two compartments, there being an opening of predetermined size through the piston communicating between the compartments, and a fluid medium completely filling said compartments and opening.

LUTHER W. GRAYSON.